Jan. 31, 1961 M. R. LANNERT 2,969,634
ROTARY LAWN MOWER BLADE
Filed Oct. 23, 1957
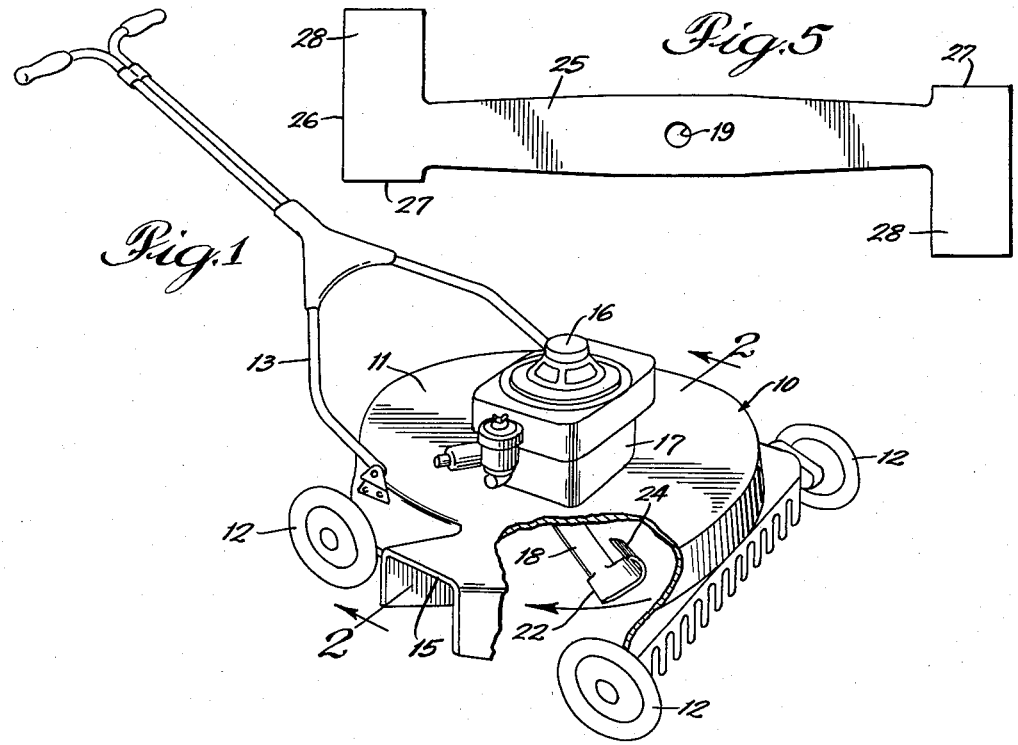
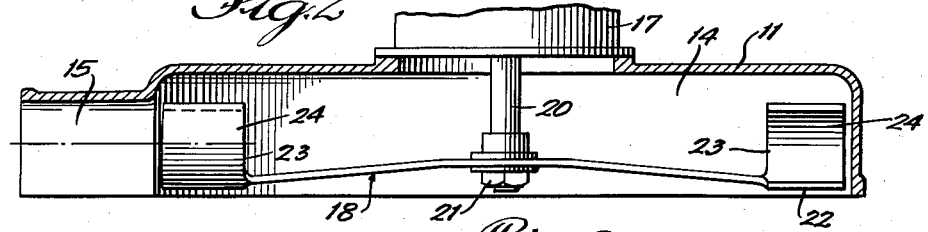
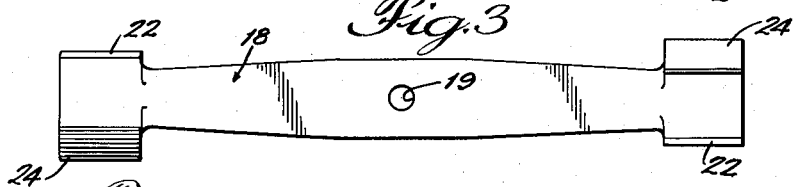
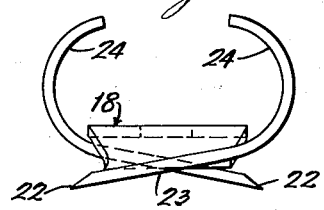
INVENTOR:
Melvin R. Lannert,
BY Dawson, Tilton, Fallon & Lungmus
ATTORNEYS.

United States Patent Office 2,969,634
Patented Jan. 31, 1961

2,969,634

ROTARY LAWN MOWER BLADE

Melvin R. Lannert, 1921 De Cook Ave., Park Ridge, Ill.

Filed Oct. 23, 1957, Ser. No. 691,826

3 Claims. (Cl. 56—25.4)

This invention relates generally to rotary lawn mowers, and more specifically, to an improved cutter blade therefor.

In recent years, rotary power mowers have come into widespread use largely because of their simplicity of construction and operation and their relatively low cost. Characteristically, such mowers are equipped with horizontally rotatable blades having downwardly and forwardly inclined cutting edges adjacent opposite ends thereof so that as grass is cut by the rapidly rotating blades the clippings are deflected upwardly and outwardly through discharge openings provided in the protective covers or casings.

As is well recognized by manufacturers and users, a rotary cutter operates most effectively when the lawn is in a relatively dry condition. Under these circumstances, the clippings are discharged in an even and continuous stream through the discharge port of the machine. However, when the grass is damp or wet, the clippings tend to cling to the undersurface of the protective cover and are either expelled in large clumps or accumulate beneath the cover to such a degree that rotary action of the cutter blade is impaired or interrupted. Attempts have been made to overcome this difficulty, but such efforts have been generally unsuccessful. For instance, blades have been designed with outwardly and rearwardly inclined trailing edges to increase the updraft within the casing and to expel the clippings more forceably through the exhaust ports. Experience has shown, however, that such a construction simply tends to increase the accumulation and matting of cut grass on the underside of a cover and causes the damp clippings to adhere even more securely because of the upwardly directed air currents.

Therefore, one of the main objects of the present invention is to overcome the aforementioned defects and disadvantages of present mower and blade constructions. Another object is to provide an improved cutter blade which, in combination with a conventional rotary mower, operates to forceably expel grass cut with each sweep of the blade even though the grass is damp or wet. A further object is to provide an improved rotary mower in which clippings, either damp or dry, are centrifugally expelled from the machine and are evenly distributed over adjacent areas of the lawn.

Other objects will appear from the specification and drawings in which:

Figure 1 is a perspective view of a rotary power mower, the cover of the mower being partially cut-away to expose the improved blade of the present invention; Figure 2 is an enlarged sectional view taken along line 2—2 of Figure 1; Figure 3 is a top plan view of the cutter blade; Figure 4 is an enlarged end elevation of the blade; and Figure 5 is a top plan view of a blank from which the cutter blade is formed.

In the embodiment illustrated in the drawings, the numeral 10 generally designates a rotary mower equipped with a cover or casing 11, wheels 12 and a handle 13 pivotally secured to the casing. The cover or casing defines a downwardly-opening cylindrical cavity 14 and is provided with a lateral discharge port or opening 15. In the illustration given, the power means for driving the rotary blade comprises an internal combustion engine 16 which is secured to the top of the casing 11 and projects upwardly therefrom, although it is to be understood that other suitable blade driving means may be employed. Since the structure so far described is entirely conventional and is well known in the art, a more detailed description of this structure is believed unnecessary herein.

As shown most clearly in Figures 2 and 3, the horizontal cutter blade 18 comprises an elongated plate apertured centrally at 19 to receive the threaded lower end portion of vertical drive shaft 20. The blade is securely fastened to the shaft by a nut 21 threaded thereon or by any other suitable fastening means. Therefore, it is apparent that when shaft 20 is rotated by engine or motor 16 the cutter blade 18 is rotated in a horizontal plane within the chamber of casing 11. Preferably, the plate or blade slopes downwardly and outwardly in opposite directions from the central connection so that the cutting edges 22 provided by end portions 23 will be disposed below the lower end of the vertical drive shaft.

In Figure 4 it will be seen that the end portions 23 of the blade are angled downwardly and forwardly in the direction of blade rotation and that the leading edges are tapered or beveled to provide sharpened horizontal cutting edges 22. It will also be noted that the trailing portions curve upwardly and forwardly to define forwardly directed scoops 24 which, as will be described shortly, operate to limit the upward movement of clippings cut by the sharpened leading edges when the mower is in operation.

The blade, including scoops 24, may be formed from a single sheet of tempered steel or other suitable material. Figure 5 shows the die-cut blank 25 which is then formed into the completed cutter blade by pitching end portions 26, sharpening edges 27, and reversely turning rear portions 28.

Unlike conventional mowers equipped with ordinary rotary cutter blades, mower 10 does not operate on the principle of creating an up-draft of sufficient magnitude to blow the clippings upwardly and outwardly in a continuous stream through a discharge port. Instead, scoops 24 with their forwardly facing upper edges prevent clippings from being conveyed upwardly toward the casing roof despite the slight up-draft induced by the pitch of end portions 23. The grass cut by the cutting edges at each end of the cutter blade is caught by the C-shaped scoops and is restrained from outward movement by the cover's cylindrical side wall until these scoops swing past the discharge port 15. At the instant a scoop passes the port the collected clippings, because of the centrifugal force developed by the high rotational speed of the blade, are thrown outwardly therethrough. Therefore, the structure of the present invention produces a positive discharge by forcibly expelling under centrifugal action the quantities of grass cut and collected during each forward sweep of the blade. While the discharge is in fact intermittent, the high rotational speed of the cutter blade gives it the appearance of a continuous stream from the outlet opening of the machine.

For optimum efficiency and directional control over the discharge, the cylindrical casing should have an inside diameter only slightly greater than the diameter or length of the rotary cutter blade. In addition, the discharge port of the casing should be located so that it is in axial alignment, or at least in horizontal register, with the scoops of the cutter blade at the instant of centrifugal discharge.

It has been found that a mower equipped with a cutter blade embodying the present invention will operate to expel clippings cut during each sweep of a cutting edge even though the grass is damp or even wet. Since the C-shaped scoops with their forwardly projecting upper edges catch the clippings and thereby limit their upward travel, the problems inherent in conventional structures of grass sticking to the cover's undersurface and either clogging the machine or being discharged in wads or clumps are completely eliminated.

While in the foregoing I have disclosed an embodiment of the present invention in considerable detail, it will be understood by those skilled in the art that many of these details may be varied widely without departing from the spirit and scope of the invention.

I claim:

1. A rotary lawn mower cutter blade adapted to prevent wet clippings from accumulating upon the undersurface of a mower casing and thereby interfering with the blade rotation, comprising a horizontally elongated blade adapted for central attachment to a vertical power shaft for rotation thereby in a horizontal plane, said blade having opposite end portions each providing a sharpened horizontal lower edge facing in the direction of blade rotation, said end portions each extending rearwardly behind said lower edge and then curving upwardly and forwardly to define C-shaped scoops having upper horizontal edges also facing in the direction of blade rotation, whereby, upon rotation of said blade said scoops catch clippings to prevent the same from being impelled upwardly against the undersurface of said casing.

2. A rotary lawn mower comprising a casing defining a chamber and having a lateral discharge port communicating therewith, a vertical shaft extending downwardly into the central portion of said chamber, means for rotating said vertical shaft, and a horizontal elongated cutter blade disposed within said chamber and centrally secured to the lower end of said vertical shaft for rotation thereby in a horizontal plane, said blade having opposite end portions each providing a sharpened horizontal lower edge facing in the direction of blade rotation, said end portions each extending rearwardly behind said lower edge and then curving upwardly and forwardly to define C-shaped scoops having upper horizontal edges also facing in the direction of blade rotation, said scoops being open at the ends of said blade and being disposed at substantially the same elevation as said lateral discharge port, for the centrifugal discharge of clippings cut by said blade and caught by said scoops, whereby, upon rotation of said blade said scoops catch clippings to prevent the same from being impelled against and accumulating upon the undersurface of said casing within said chamber.

3. The structure of claim 2 in which said casing defines a chamber of cylindrical shape, said chamber having a diameter slightly greater than the length of said cutter blade.

References Cited in the file of this patent

UNITED STATES PATENTS

| | | |
|---|---|---|
| 2,669,826 | Watrous | Feb. 23, 1954 |
| 2,720,070 | Arrington | Oct. 11, 1955 |
| 2,721,438 | O'Maley | Oct. 25, 1955 |
| 2,762,188 | Klein | Sept. 11, 1956 |
| 2,807,126 | Bennett | Sept. 24, 1957 |
| 2,836,021 | Wood et al. | May 27, 1958 |

FOREIGN PATENTS

| | | |
|---|---|---|
| 255,896 | Switzerland | July 31, 1948 |